(12) United States Patent
Kamimura (10) Patent No.: US 8,164,692 B2
(45) Date of Patent: Apr. 24, 2012

(54) GAMMA CORRECTION CIRCUIT, GAMMA CORRECTION METHOD, AND IMAGE PROCESSING APPARATUS

(75) Inventor: Shigeki Kamimura, Tsurugashima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1134 days.

(21) Appl. No.: 12/015,722

(22) Filed: Jan. 17, 2008

(65) Prior Publication Data

US 2008/0180577 A1 Jul. 31, 2008

(30) Foreign Application Priority Data

Jan. 26, 2007 (JP) ................................. 2007-016634

(51) Int. Cl.
*H04N 5/202* (2006.01)
*H04N 9/64* (2006.01)
(52) U.S. Cl. ........................................ 348/674; 348/718
(58) Field of Classification Search .................. 348/674, 348/718
See application file for complete search history.

(56) References Cited

U.S. PATENT DOCUMENTS

| 5,880,786 | A | 3/1999 | Oku | |
|---|---|---|---|---|
| 6,310,651 | B1 * | 10/2001 | Mizutome | 348/459 |
| 7,453,523 | B2 * | 11/2008 | Yamauchi | 348/607 |

FOREIGN PATENT DOCUMENTS

| JP | 759055 | 3/1995 |
|---|---|---|
| JP | 2001282173 | 10/2001 |
| JP | 2002108701 | 4/2002 |
| JP | 2003348442 | 12/2003 |
| JP | 2004007076 | 1/2004 |
| JP | 2005192230 | 7/2005 |
| JP | 2006106345 | 4/2006 |
| JP | 2006243233 | 9/2006 |
| JP | 772851 | 1/2008 |
| JP | 2005121767 | 1/2008 |

OTHER PUBLICATIONS

Japanese Patent Application No. 2007-016634, Notice of Reasons for Rejection, mailed Aug. 23, 2011, (with English Translation).

* cited by examiner

*Primary Examiner* — James R Sheleheda
(74) *Attorney, Agent, or Firm* — Blakely, Sokoloff, Taylor & Zafman LLP (57) ABSTRACT

According to one embodiment, a gamma correction circuit including a serial storage unit which serially stores first and second parameter information in a storage area, a first parallel storage unit which parallelly stores the first parameter information in the storage area, a second parallel storage unit, a gamma correction unit which receives a video signal and which performs gamma correction to the video signal based on the first or second parameter information, and a control unit which serially reads the first or second parameter information, parallelly stores the information in the first or second parallel storage units, parallelly reads the first or second parameter information, supplies the information to the gamma correction unit, and performs gamma correction to the video signal based on the first or second parameter information.

6 Claims, 6 Drawing Sheets

GAMMA CORRECTION CIRCUIT, GAMMA CORRECTION METHOD, AND IMAGE PROCESSING APPARATUS

CROSS-REFERENCE TO RELATED APPLICATIONS

This application is based upon and claims the benefit of priority from Japanese Patent Application No. 2007-016634, filed Jan. 26, 2007, the entire contents of which are incorporated herein by reference.

BACKGROUND

1. Field

One embodiment of the present invention relates to a gamma correction circuit, a gamma correction method, and an image display apparatus which use parameters supplied from a plurality of memories.

2. Description of the Related Art

In recent years, a large number of digital devices have been developed and used, and a large number of techniques in various fields are known for video processing using digital techniques. As one of the techniques, a gamma correction process which is a video processing technique is known. More specifically, a numerical called "gamma (γ)" used to express a response characteristic of a gradient of an image is used. However, for example, on a display, a brightness of a surface exhibits an exponential change without being in proportion to an input voltage. When the input voltage is small, the brightness is moderate. When the input voltage becomes large, the change in brightness sharply increases. When this relationship describes a curve having a power of 2.2, a gamma is given as 2.2. Gamma=1 denotes a straight line. Such a gamma correction process is used in, for example, a video processing unit such as of a digital television apparatus.

Patent Document (Jpn. Pat. Appln. KOKAI Publication No. 2005-121767) discloses a gamma conversion circuit which performs first gamma conversion and second gamma conversion to a video signal and in which outputs from first and second conversion circuits are switched by a selection circuit every frame/pixel. In this manner, a plurality of gamma conversion processes can be performed.

However, since the conventional art described in Patent Document 1 uses a plurality of gamma correction processes, a plurality of gamma correction circuits are necessary. Furthermore, since the gamma correction processes are normally realized by a table scheme using a plurality of SRAMs, a circuit scale disadvantageously increases.

In the conventional art in Patent Document 1, when a video signal is read from a normal serial storage unit (ROM or the like), parameter information can be read at only a rate of, for example, about 400 kbyte/s by a data transmission method called I²CBus (I squared C Bus). For this reason, disadvantageously plural pieces of parameter information cannot be instantaneously switched and processed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a gamma correction circuit comprising:

a serial storage unit which serially stores first parameter information and second parameter information different from the first parameter information in a storage area;

a first parallel storage unit which parallelly stores the first parameter information from the serial storage unit in the storage area;

a second parallel storage unit which parallelly stores the second parameter information from the serial storage unit in the storage area;

a gamma correction unit which receives a video signal and which performs gamma correction to the video signal based on the first parameter information or the second parameter information to output the video signal; and a control unit which serially reads the first parameter information or the second parameter information from the serial storage unit, parallelly stores the information in the first parallel storage unit or the second parallel storage unit, parallelly reads the first parameter information or the second parameter information from the first parallel storage unit or the second parallel storage unit, supplies the first parameter information or the second parameter information to the gamma correction unit, and causes the gamma correction unit to perform gamma correction to the video signal based on the supplied first parameter information or second parameter information to output the video signal.

An embodiment of the present invention provides a small-scale gamma correction circuit, a gamma correction method, and an image processing apparatus which can perform a gamma correction process while switching pieces of parameter information at a high speed.

One embodiment for achieving the object is a gamma correction circuit comprising:

a serial storage unit (11) which serially stores first parameter information and second parameter information different from the first parameter information in a storage area;

a first parallel storage unit (13) which parallelly stores the first parameter information from the serial storage unit in the storage area;

a second parallel storage unit (14) which parallelly stores the second parameter information from the serial storage unit in the storage area;

a gamma correction unit (17) which receives a video signal and which performs gamma correction to the video signal based on the first parameter information or the second parameter information to output the video signal; and a control unit (22) which serially reads the first parameter information or the second parameter information from the serial storage unit, parallelly stores the information in the first parallel storage unit or the second parallel storage unit, parallelly reads the first parameter information or the second parameter information from the first parallel storage unit or the second parallel storage unit, supplies the first parameter information or the second parameter information to the gamma correction unit, and causes the gamma correction unit to perform gamma correction to the video signal based on the supplied first parameter information or second parameter information to output the video signal.

In this manner, the plural pieces of parameter information are stored in the plurality of parallel storage units (SRAMs or the like), and signals from the plurality of parallel storage units are switched at a high speed, so that gamma correction for each frame of a video signal can be performed by using the plural pieces of parameter information.

An embodiment of the present invention will be described below in detail with reference to the accompanying drawings.
<Gamma Correction Circuit According to one Embodiment of the Present Invention>

An example of a configuration of a gamma correction circuit according to an embodiment of the present invention will be described first, and an example of a gamma correction process will be described secondly.

(Configuration)

Figure 1:
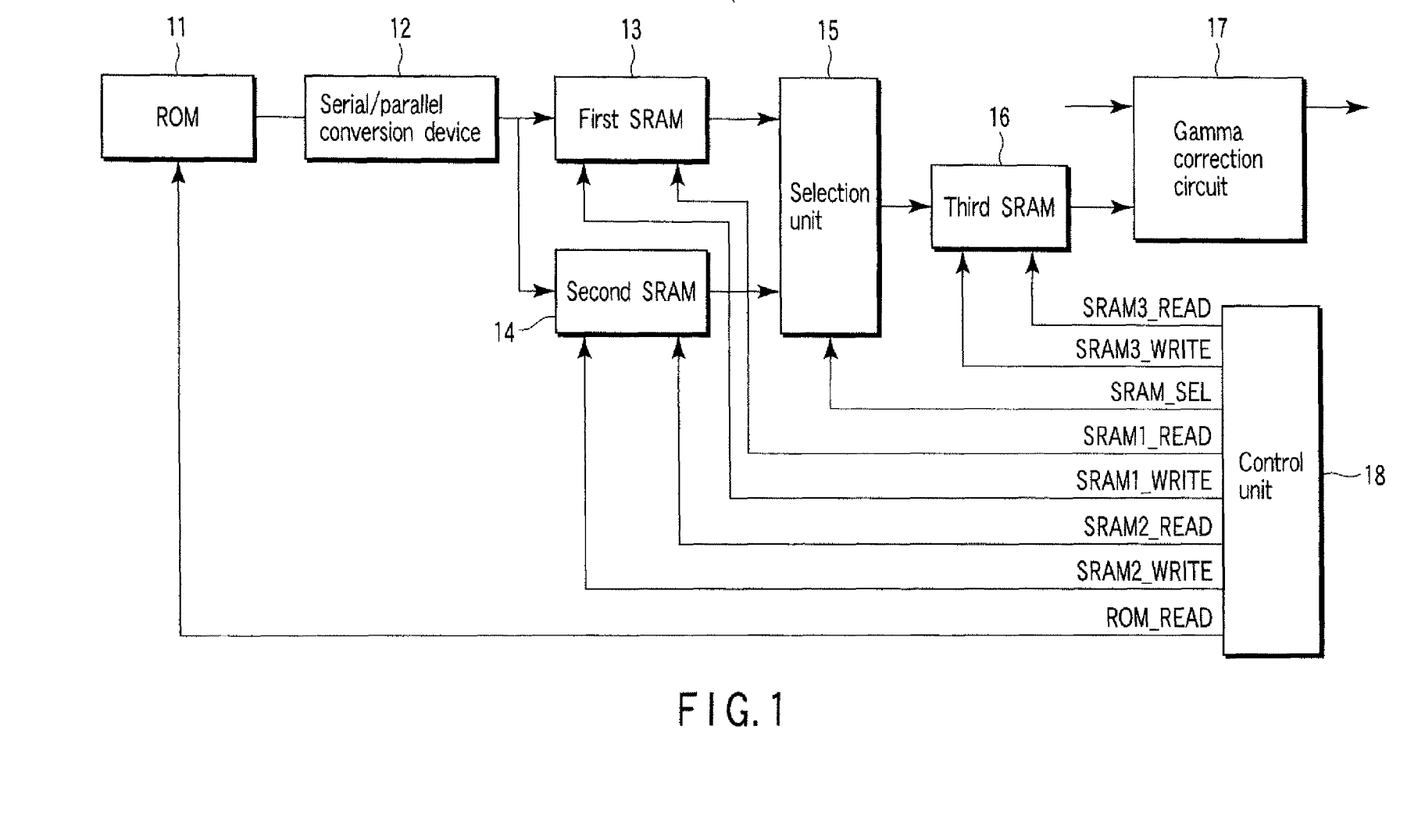
FIG. 1 is a block diagram showing an example of a gamma correction circuit according to an embodiment of the present invention.

FIG. 1 is a block diagram showing an example of a gamma correction circuit according to an embodiment of the present invention. A gamma correction circuit 144 according to the embodiment of the present invention has, in FIG. 1, a serial ROM 11, a serial/parallel conversion device 12 which converts parameter information serving as serial data read from the serial ROM 11 into parallel data, a first SRAM 13 serving as a parallel storage unit in which the parameter information serving as the parallel data converted by the serial/parallel conversion device 12 is stored, a second SRAM 14, and a selection unit 15 which selectively outputs the parameter information read from the first SRAM 13 and the second SRAM 14. Furthermore, the gamma correction circuit 144 has a third SRAM 16 serving as a parallel storage unit in which data serving as an output from the selection unit 15 is stored in parallel, a gamma correction circuit 17 which receives the parameter information from the third SRAM 16 and performs a gamma correction process of a given video signal on the basis of the parameter information, and a control unit 18 which controls operations of the respective units.

In this case, the serial storage unit such as the serial ROM 11 cannot store or retrieve data at a high speed because the number of terminals from which data are extracted is much smaller than the number of data bits. For example, when an I²CBus scheme is used, the parameter information can be read only at a speed of, for example, about 400 kbytes/s at most.

On the other hand, the SRAM or the like serving as the parallel storage unit has terminals the number of which is almost equal to the number of data bits to make it possible to store and read data at once. In this manner, for example, parameter information for gamma correction can be supplied to the gamma correction circuit 17 at a transfer rate of 150 Mbps or the like.

(Operation)

Figure 2:
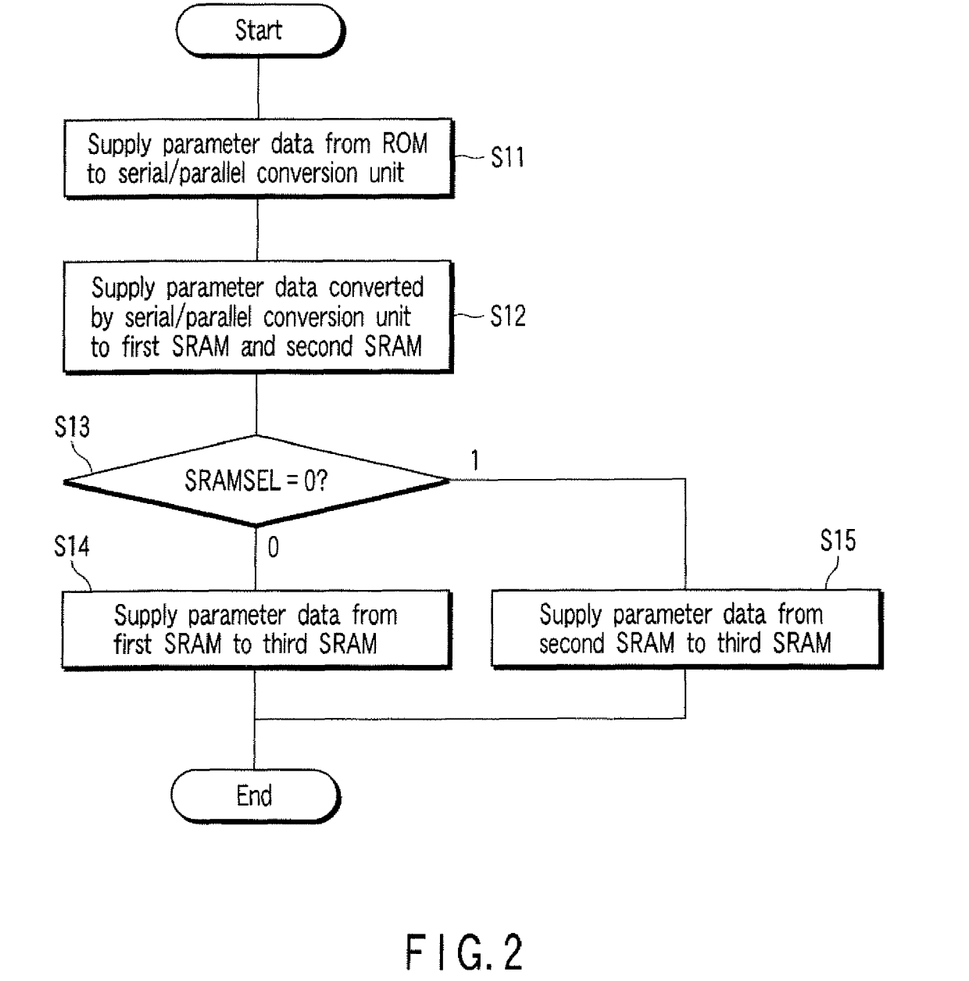
FIG. 2 is a flow chart showing an example of a gamma correction process of the gamma correction circuit according to the embodiment of the present invention.
Figure 3:
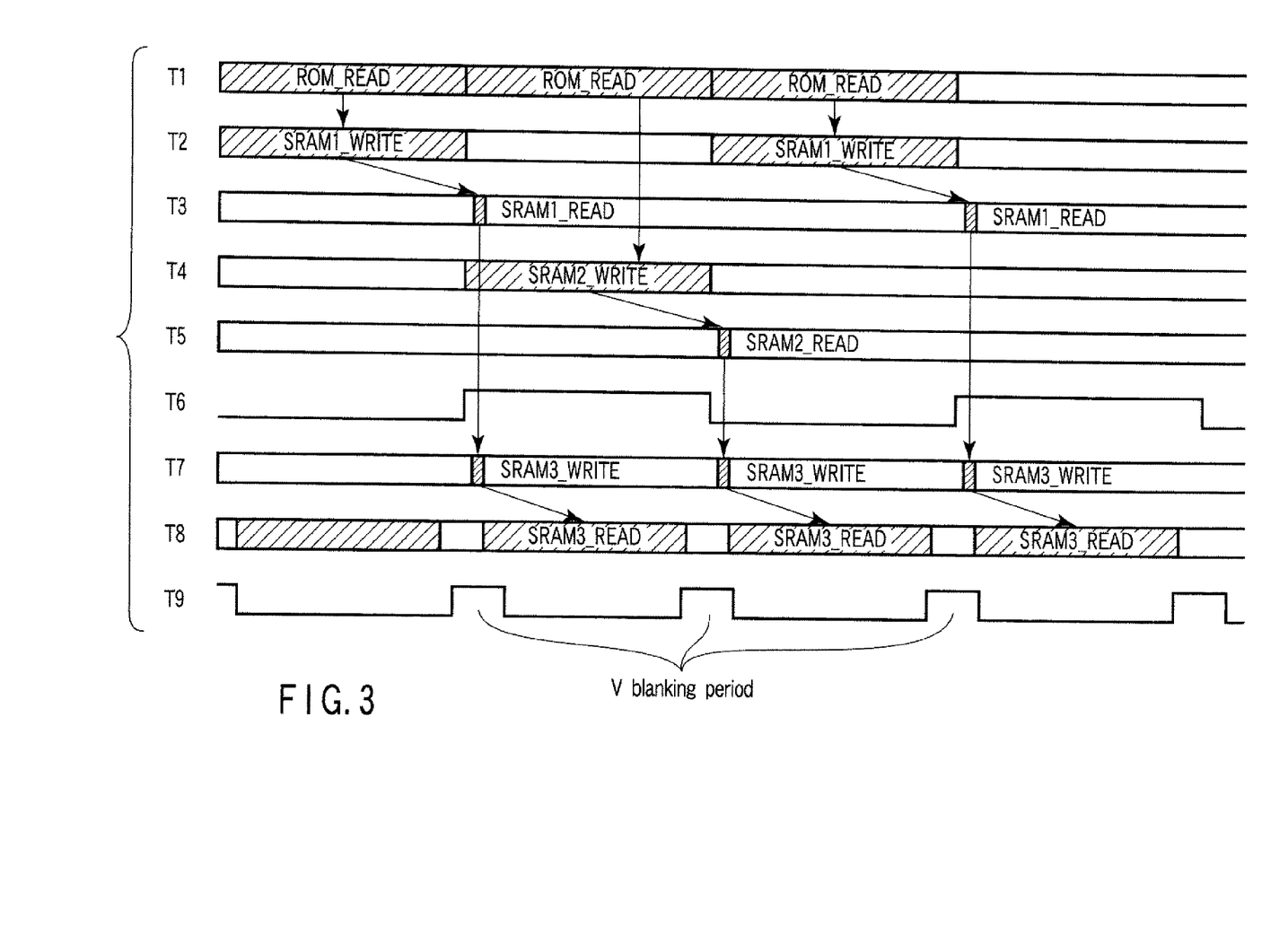
FIG. 3 is a timing chart showing an example of the gamma correction process of the gamma correction circuit according to the embodiment of the present invention.
Figure 4:
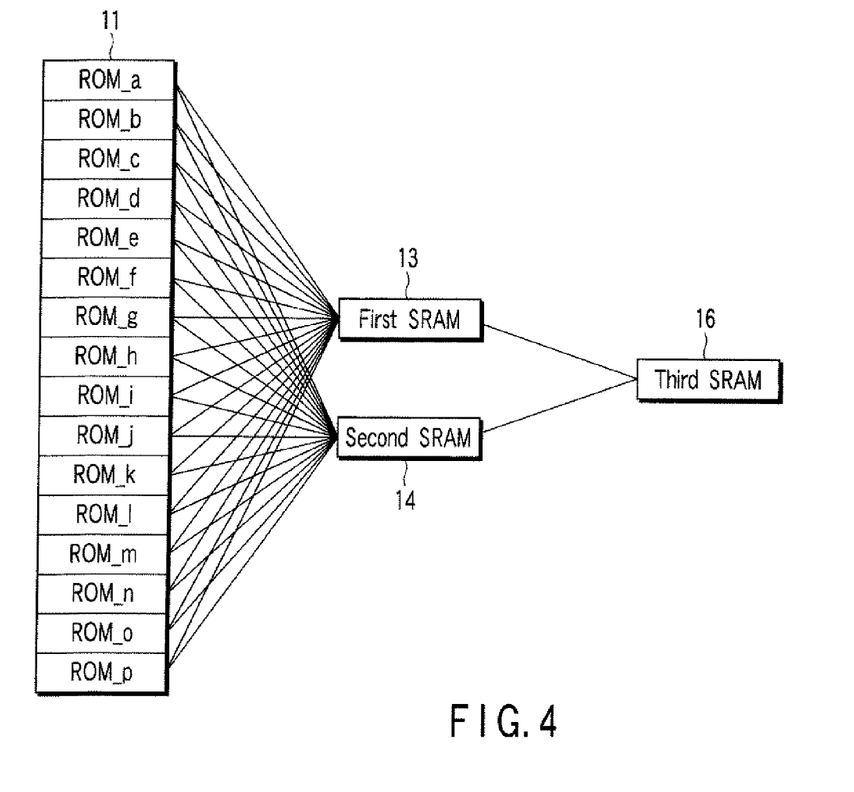
FIG. 4 is an explanatory diagram showing an example of a relationship between parameter information and a plurality of SRAMs in the gamma correction circuit according to the embodiment of the present invention.
Figure 5A:
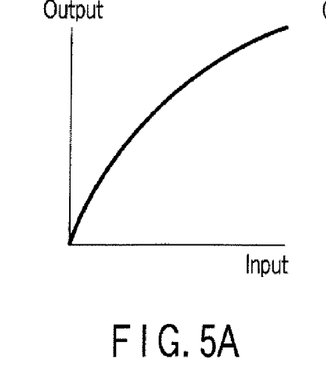
FIGS. 5A to 5C are explanatory diagrams for explaining gamma correction of the gamma correction circuit according to the embodiment of the present invention.
Figures 5B, 5C:
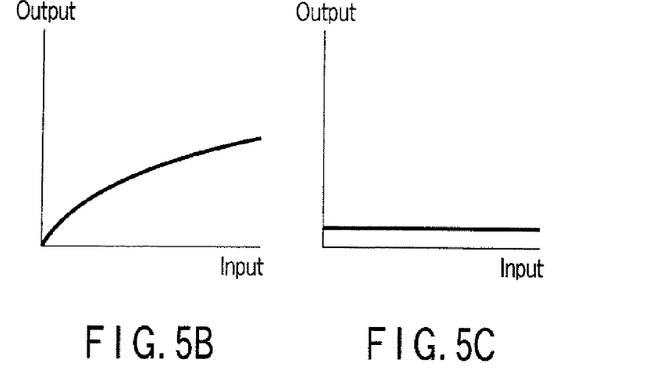

The gamma correction circuit 17 having the above configuration performs the following gamma correction process operation. FIG. 2 is a flow chart showing an example of a gamma correction process of the gamma correction circuit according to the embodiment of the present invention. FIG. 3 is a timing chart showing an example of the gamma correction process of the gamma correction circuit according to the embodiment of the present invention. FIG. 4 is an explanatory diagram showing an example of a relationship between parameter information and a plurality of SRAMs in the gamma correction circuit according to the embodiment of the present invention. FIGS. 5A to 5C are explanatory diagrams for explaining gamma correction of the gamma correction circuit according to the embodiment of the present invention.

The gamma correction process of the gamma correction circuit 17 shown in FIG. 1 will be described below with reference to the flow chart in FIG. 2, the timing chart in FIG. 3, and the explanatory diagrams in FIGS. 4 and 5.

First, the parameter information is serially read from the serial ROM 11 under the control of the control unit 18 (T1) and supplied to the serial/parallel conversion device 12 (step S11). An output from the serial/parallel conversion device 12 is written in the first SRAM 13 at a low speed (steps S12 and T2).

Upon completion of the writing, when SRAMSEL=0 (step S13), data is read from the first SRAM 13 at a high speed (T3), and the data read from the third SRAM 16 is parallelly written (steps S14 and T7).

At this time, the data written in the second SRAM 14 is serially read from the serial ROM 11 (steps S11 and T1) and begins to be written in the second SRAM 14 at a low speed (T4). Upon completion of the writing in the second SRAM 14, when SRAMSEL=1 (step S13), data is read from the second SRAM 14 at a high speed (T5), and the read data is written in the third SRAM 16 (steps S15 and T7).

Since the gamma data in FIGS. 5A and 5B are stored in the first SRAM 13 and the second SRAM 14, the parameter information is transferred to the third SRAM 16 by switching operations of the control unit 18 and the selection unit 15 every field. The parameter information read from the third SRAM 16 is supplied to the gamma correction circuit 17. In this manner, the pieces of parameter information for gamma correction of two types are switched at a high speed so as to be supplied to the gamma correction circuit 17.

At this time, as shown in the timing chart in FIG. 3, in a vertical blanking period (T9) of a video signal given to the gamma correction circuit 17, read operations from an SRAM 1 and an SRAM 2 (T3 and T5) and a write operation in a SRAM 3 (T7) are performed.

Similarly, as shown in the timing chart in FIG. 3, in a horizontal blanking period (T6) of a video signal given to the gamma correction circuit 17, a read process from the serial ROM 11 (T1), write operations in the SRAM 1 and the SRAM 2 (T2 and T4), and a read operation from the SRAM 3 (T8) are performed.

When data of two or more types are to be switched, at a timing at which the data in the second SRAM 14 is written as data in the third SRAM 16, another data is read from the serial ROM 11 and written in the first SRAM 13.

The method of switching gamma data of two types has been described above. However, in place of data in FIG. 5B, data in FIG. 5C is used to also make it possible to insert a flat-level video of a gray level or a black level into each field.

In this manner, the flat-level video is inserted to make it possible to reduce feeling of blur in a moving image on a liquid-crystal TV.

In the serial ROM 11, as shown in FIG. 4, a plurality of data ROM_a to ROM_p are stored. Data to be used is selected from the plurality of data depending on the selection signal from the control unit 18 and preferably transferred to the SRAMs 13 and 14.

The data stored in the serial ROM 11 includes various parameters of video processing. Various videos can be variably changed by changing the data.

For example, when the data is video gamma data, a video image can be made bright or dark by changing the gamma data.

FIGS. 5A to 5C show an example of the gamma data. When the gamma data in FIG. 5A and the gamma data in FIG. 5B are desired to be switched every field, an operation is performed such that the data is rewritten in the third SRAM 16 every field. However, when the data is tried to be directly written from the serial ROM 11, this writing is impossible in terms of time because a read speed from the serial ROM 11 is very low.

Therefore, the data in FIG. 5A and the data in FIG. 5B read from the serial ROM 11 are written in the first SRAM 13 and the second SRAM 14 serving as parallel storage units, respectively. Furthermore, the third SRAM 16 serving as a parallel storage unit is arranged, and the data are read from the first SRAM 13 and the second SRAM 14 at a high speed to make it possible to solve the problem in terms of time.

(Configuration of Another Gamma Correction Circuit)

Figure 6:
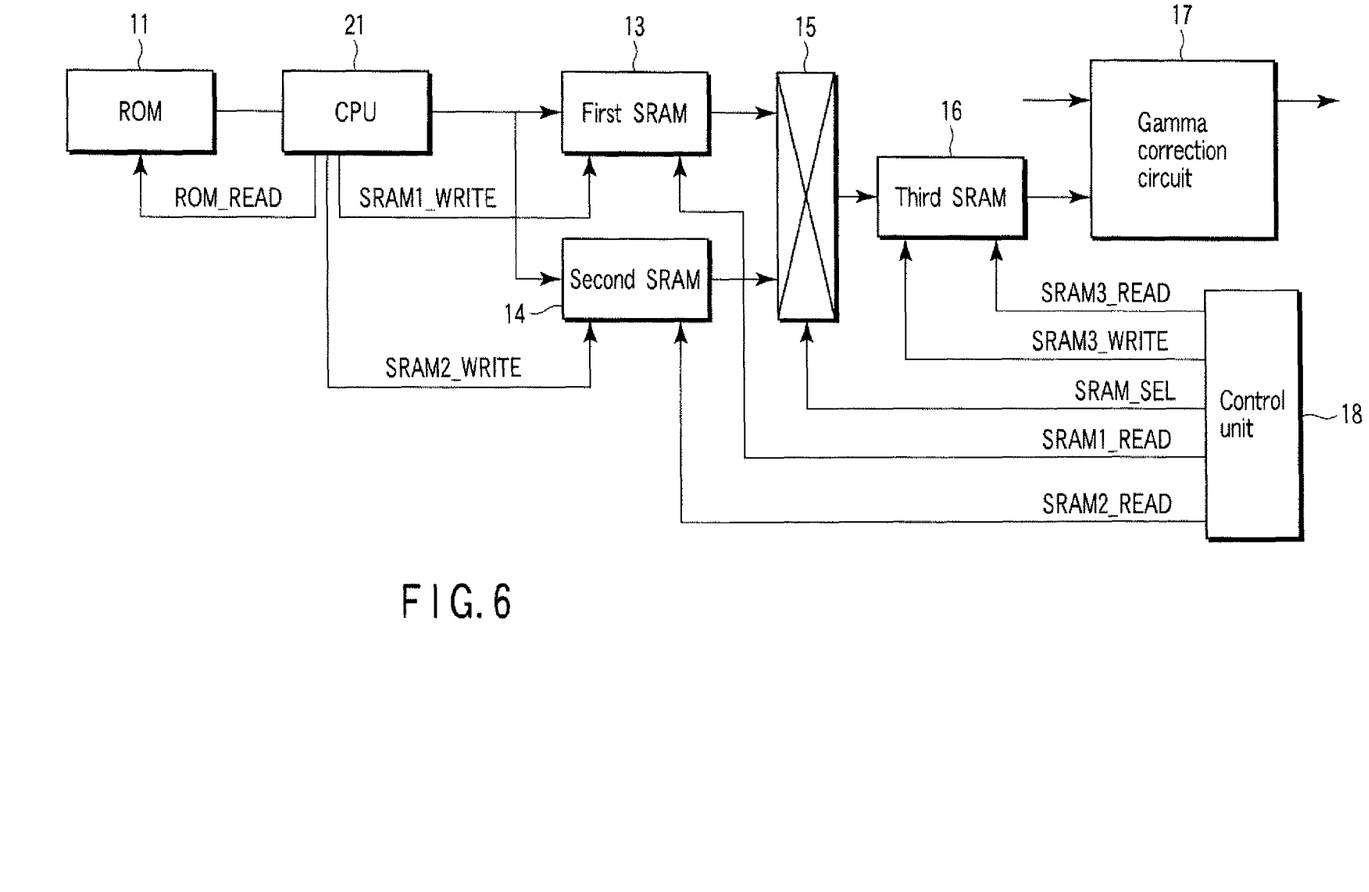
FIG. 6 is a block diagram showing another example of the gamma correction circuit according to the embodiment of the present invention.

An example of a configuration of another gamma correction circuit will be described below with reference to FIG. 6. FIG. 6 is a block diagram showing another example of the gamma correction circuit according to the embodiment of the present invention.

In FIG. 1, serial data read from a serial RON is converted into parallel data by the serial/parallel conversion device 12. In FIG. 6, the configuration in which an arithmetic processing unit (CPU) 21 is further arranged is employed. The CPU 21 operates to receive serial data from the serial ROM 11 and to convert the serial data into parallel data, and then to write the parallel data in the first SRAM 13 and the second SRAM 14.

<Broadcasting Receiver using Gamma Correction Circuit According to one Embodiment of the Present Invention>
(Configuration and Operation of Broadcasting Receiver)

Figure 7:
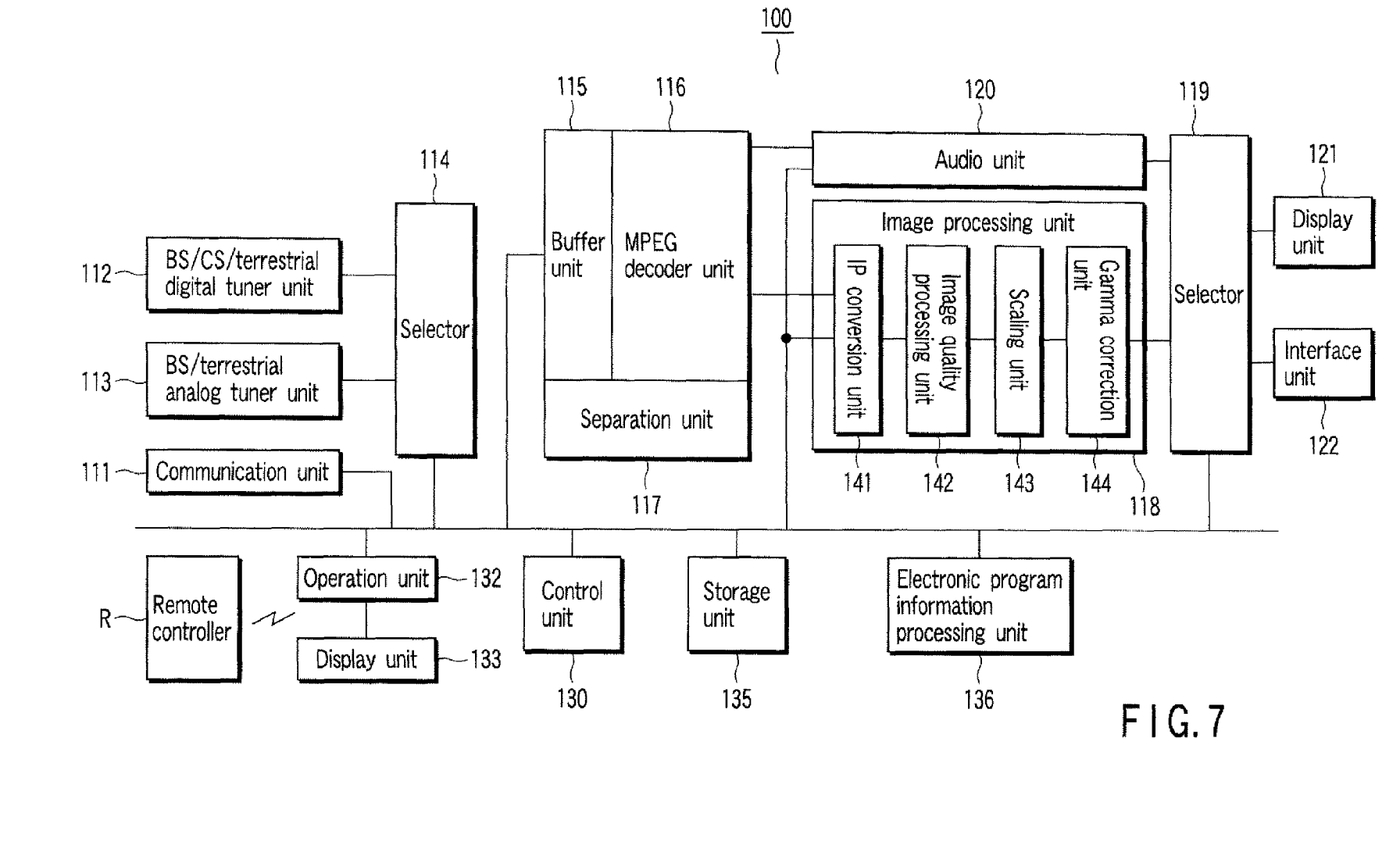
FIG. 7 is a block diagram showing an example of a configuration of a broadcasting receiver using the gamma correction circuit according to the embodiment of the present invention.

Furthermore, an example of a configuration of a broadcasting receiver serving as a digital television apparatus using the gamma correction circuit according to the embodiment of the present invention will be described below in detail with reference to the drawing. FIG. 7 is a block diagram showing an example of a configuration of a broadcasting receiver using the gamma correction circuit according to the embodiment of the present invention.

A broadcasting receiver 100, as shown in FIG. 7, is a television apparatus. A control unit 130 is connected to each unit through data buses to control an entire operation of the apparatus.

The broadcasting receiver 100 in FIG. 7 includes, as main constituent elements, an MPEG decoder unit 116 constituting a reproducing side and the control unit 130 controlling an operation of a main body of the apparatus. The broadcasting receiver 100 has an input-side selector 114 and an output-side selector 119. To the input-side selector 114, a communication unit 111 having a LAN function or a mail function, a BS/CS/terrestrial digital tuner unit 112, and a BS/terrestrial analog tuner unit 113 are connected.

Furthermore, the broadcasting receiver 100 has an MPEG decoder unit 116, a separation unit 117, a storage unit 135 which arbitrarily records video information or the like from the tuner unit, and an electronic program information processing unit 136 which acquires electronic program information from a broadcasting signal or the like to display the information on a screen. These units are connected to the control unit 130 through data buses. Furthermore, an output from the selector 119 is connected to the display unit 121 and supplied to an external apparatus through an interface unit 122 which communicates with the external apparatus.

In addition, the broadcasting receiver 100 has an operation unit 132 which is connected to the control unit 130 through the data bus and which is operated by a user or operated through a remote controller R. In this case, the remote controller R enables an operation almost equal to that of the operation unit 132 arranged in the main body of the broadcasting receiver 100, and can perform various settings such as operation of the tuner.

In the broadcasting receiver 100, broadcasting signals are input from a receiving antenna to the tuner units 112 and 113, and tuning is performed. The selected video/audio signal is decoded by the MPEG decoder unit 116 or the like and supplied to a video processing unit 118. The video processing unit 118 has an IP conversion unit 141 which converts an interlace signal into a progressive signal, an image quality processing unit 142 which performs a coring process and an enhancement process, a scaling unit 143 which performs a scaling process, and a gamma correction unit 144 which performs γ-correction of the video signal.

These input signals are managed by the control unit 130 and switched to a signal to be input to the video processing unit 118. In order to perform tuning and input switching, an operation signal from the remote controller R is supplied to the control unit 130 through the operation unit 132. As a result, the MPEG decoder unit 116 and the video processing unit 118 are controlled. The video signal processed by the video processing unit 118 is displayed on the display unit 121 through the selector 119, and an audio signal is supplied to a loudspeaker or the like (not shown).

As described above, according to the embodiment of the present invention, image processing data can be switched at a high speed. In particular, plural pieces of parameter information can be switched at a high speed in the gamma correction circuit.

The storage device in which image processing data of various types are stored need not have a high-speed interface. If anything, it can be said that an interface such as a serial interface having a small number of signal lines is suitable for interface with an LSI.

According to the embodiments as described above, a person skilled in the art can realize the present invention. However, furthermore, a person skilled in the art can easily conceive of various modifications of the embodiments, and can apply the present invention to various embodiments without inventive ability. Therefore, the present invention covers a wide range consistent with the disclosed principle and the novel characteristic features, and is not limited to the embodiments described above.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A gamma correction circuit comprising:
  a serial storage unit which serially stores first parameter information having a first gamma curve character for at least one of fields, and second parameter information having a second gamma curve character for at least one of other fields, which is different from the first gamma curve character, in a storage area;
  a first parallel storage unit which parallelly stores the first parameter information from the serial storage unit in the storage area;
  a second parallel storage unit which parallelly stores the second parameter information from the serial storage unit in the storage area;
  a gamma correction unit which receives a video signal and which performs gamma correction to the video signal based on the first parameter information or the second parameter information to output the video signal; and
  means for serially reading the first and the second parameter information from the serial storage unit;
  means for parallelly storing and preparing the first and the second parameter information in the first and second parallel storage units, respectively; and
  means for reading the first parameter information or the second parameter information from the first parallel storage unit or the second parallel storage unit in a blanking period in a vertical direction of the video signal, when a gamma correction curve character of the gamma correction unit is switched.

2. The gamma correction circuit according to claim 1, further comprising:
  a serial/parallel conversion unit arranged as a subsequent part of the serial storage unit.

3. A video processing apparatus comprising:
  an IP conversion unit which receives a video signal to perform IP conversion to the video signal;
  a scaling unit which performs a scaling process for the video signal subjected to the IP conversion;
  a serial storage unit which serially stores first parameter information having a first gamma curve character for at least one of fields, and second parameter information having a second gamma curve character for at least one of other fields, which is different from the first gamma curve character, in a storage area;
  a first parallel storage unit which parallelly stores the first parameter information from the serial storage unit in the storage area;
  a second parallel storage unit which parallelly stores the second parameter information from the serial storage unit in the storage area;
  a gamma correction unit which receives a video signal subjected to the scaling process from the scaling unit and which performs gamma correction based on the first parameter information or the second parameter information to output the video signal; and
  means for serially reading the first and the second parameter information from the serial storage unit;
  means for parallelly storing and preparing the first and the second parameter information in the first and second parallel storage units, respectively; and
  means for reading the first parameter information or the second parameter information from the first parallel storage unit or the second parallel storage unit in a blanking period in a vertical direction of the video signal, when a gamma correction curve character of the gamma correction unit is switched.

4. The video processing apparatus according to claim 3, further comprising:
  a tuner unit which receives a broadcasting signal to output a video signal;
  a decoder unit which decodes the video signal from the tuner unit to supply the decoded video signal to the IP conversion unit; and
  a display unit which receives the video signal subjected to the gamma correction from the gamma correction unit and displays a video on a screen based on the video signal.

5. The video processing apparatus according to claim 3, further comprising:
  a serial/parallel conversion unit arranged as a subsequent part of the serial storage unit.

6. A gamma correction method comprising:
  serially reading first parameter information having a first gamma curve character for at least one of fields, or second parameter information having a second gamma curve character for at least one of other fields, which is different from the first gamma curve character, from a serial storage unit;
  parallelly storing and preparing the first parameter information and the second parameter information in a first parallel storage unit and a second parallel storage unit, respectively;
  parallelly reading the first parallel information or the second parameter information from the first parallel storage unit or the second parallel storage unit to supply the first parameter information or the second parameter information to a gamma correction unit in a blanking period in a vertical direction of the video signal, when a gamma correction curve character of the gamma correction unit is switched.

* * * * *